(12) United States Patent
Hoff et al.

(10) Patent No.: US 7,075,606 B2
(45) Date of Patent: Jul. 11, 2006

(54) METHOD FOR MANUFACTURING AN OPTICAL COMPENSATOR ON A TRANSITIONAL SUBSTRATE

(75) Inventors: Joseph W. Hoff, Fairport, NY (US); Timothy J. Hubert, Hilton, NY (US); Gregory W. Keyes, Rochester, NY (US); Jason A. Payne, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 77 days.

(21) Appl. No.: 10/632,202

(22) Filed: Jul. 29, 2003

(65) Prior Publication Data

US 2005/0024562 A1  Feb. 3, 2005

(51) Int. Cl.
*G02F 1/1335* (2006.01)
(52) U.S. Cl. .................. 349/119; 349/117; 427/164
(58) Field of Classification Search ................ 427/162, 427/164, 165; 349/117–120; 264/1.6
See application file for complete search history.

(56) References Cited

U.S. PATENT DOCUMENTS

| | | | |
|---|---|---|---|
| 4,701,028 A | 10/1987 | Clerc et al. | |
| 5,399,390 A * | 3/1995 | Akins | 428/1.62 |
| 5,410,422 A | 4/1995 | Bos | |
| 5,583,679 A | 12/1996 | Ito et al. | |
| 5,602,661 A | 2/1997 | Schadt et al. | |
| 5,619,352 A | 4/1997 | Koch et al. | |
| 5,853,801 A | 12/1998 | Suga et al. | |
| 5,978,055 A | 11/1999 | Van De Witte et al. | |
| 5,995,184 A | 11/1999 | Chung et al. | |
| 6,157,427 A * | 12/2000 | Saynor et al. | 349/123 |
| 6,160,597 A | 12/2000 | Schadt et al. | |
| 6,814,914 B1 * | 11/2004 | Tasaka et al. | 264/217 |
| 6,867,834 B1 * | 3/2005 | Coates et al. | 349/119 |
| 2002/0041352 A1 | 4/2002 | Kuzuhara et al. | |
| 2003/0067572 A1* | 4/2003 | Umeda et al. | 349/117 |

FOREIGN PATENT DOCUMENTS

EP  1143271 A2  10/2001
EP  646829 B1  7/2002

OTHER PUBLICATIONS

Y.Satoh, H. Mazaki, E. Yoda, T. Kaminade, T. Toyooka, and Y. Kobori; "Comparison of Nematic Hybrid and Discotic Hybrid Films as Viewing Angle Compensator of NW-TN-LCDs"; SID 00 Digest, pp. 347-349.

J. Chen, K.C. Chang, and J. DelPico; "Wide Viewing Angle Photoaligned Plastic Films for TN-LCDs"; 1999 SID, Section 10.4.

* cited by examiner

*Primary Examiner*—Andrew Schechter
*Assistant Examiner*—Michael H. Caley
(74) *Attorney, Agent, or Firm*—Nelson Adrian Blish

(57) ABSTRACT

A method for manufacturing an optical compensator (5) on a transitional substrate (8) comprises applying a first orientation layer (20) to the transitional substrate. The first orientation layer (20) is then aligned and a first anisotropic liquid crystal material (30) is applied on the first orientation layer. In one embodiment, a retardation layer (10) is located between the transitional substrate (8) and the first orientation layer (20).

28 Claims, 5 Drawing Sheets

METHOD FOR MANUFACTURING AN OPTICAL COMPENSATOR ON A TRANSITIONAL SUBSTRATE

CROSS REFERENCE TO RELATED APPLICATIONS

Reference is made to commonly-assigned copending U.S. patent application Ser. No. 10/194,823, filed Jul. 12, 2002, entitled A PROCESS FOR MAKING AN OPTICAL COMPENSATOR FILM COMPRISING AN ANISOTROPIC NEMATIC LIQUID CRYSTAL, by Payne et al., U.S. patent application Ser. No. 10/194,100, filed Jul. 12, 2002, entitled A PROCESS FOR MAKING AN OPTICAL COMPENSATOR FILM COMPRISING A PHOTO-ALIGNED ORIENTATION LAYER, by Payne et al., U.S. patent application Ser. No. 10/189,679, filed Jul. 3, 2002, entitled POLYVINYL ALCOHOL FILMS PREPARED BY COATING METHODS, by Bermel; U.S. patent application Ser. No. 10/190,169, filed Jul. 3, 2002, entitled OPTICAL FILMS PREPARED BY COATING METHODS, by Bermel; U.S. patent application Ser. No. 10/194,162, filed Jul. 12, 2002, entitled COMPENSATOR WITH CROSSLINKED BARRIER LAYER AND PROCESS, by Nair et al.; U.S. patent application Ser. No. 10/390,123, filed Oct. 17, 2002, entitled COMPENSATOR WITH PHOTOCHEMICALLY CURED BARRIER LAYER AND PROCESS, by Nair et al.; and U.S. patent application Ser. No. 10/194,130, filed Jul. 12, 2002, entitled NEMATIC LIQUID CRYSTAL COMPENSATOR WITH BARRIER LAYER AND PROCESS, by Bauer et al., the disclosures of which are incorporated herein.

FIELD OF THE INVENTION

This invention relates to a method for making an optical compensator for improving viewing-angle characteristics of liquid crystal displays.

BACKGROUND OF THE INVENTION

Current rapid expansion in the use of liquid crystal displays (LCDs), in various areas of information display, is largely due to improvements of display qualities. Contrast, color reproduction, and stable gray scale intensities are important display qualities for electronic displays, which employ liquid crystal technology. The primary factor limiting the contrast of a liquid crystal display is the propensity for light to "leak" through liquid crystal elements or cell, which are in the dark or "black" pixel state. Furthermore, the leakage and hence contrast of a liquid crystal display are also dependent on the angle from which the display screen is viewed. Typically the optimum contrast is observed only within a narrow viewing angle centered about normal incidence to the display and falls off rapidly as the viewing angle is increased. In color displays, the leakage problem not only degrades the contrast, but also causes color or hue shifts with an associated degradation of color reproduction. In addition to black-state light leakage, the narrow viewing angle problem in typical twisted nematic liquid crystal displays is exacerbated by a shift in the brightness-voltage curve as a function of viewing angle because of the optical anisotropy of the liquid crystal material.

Thus, one of the major considerations for evaluating the quality of such displays is the viewing-angle characteristics, which describes a change in contrast ratio from different viewing angles. It is desirable to be able to see the same image from a wide variation in viewing angles and this ability has been a shortcoming with liquid crystal display devices. One way to improve the viewing-angle characteristics is to insert an optical compensator (also referred to as a compensation film, retardation film, or retarder) situated between the polarizer and liquid crystal cell. An optical compensator can widen the viewing-angle characteristics of liquid crystal displays, and in particular of twisted nematic (TN), super twisted nematic (STN), optically compensated bend (OCB), in plane switching (IPS), or vertically aligned (VA) liquid crystal displays. These various liquid crystal display technologies have been reviewed in U.S. Pat. No. 5,619,352 (Koch et al.), U.S. Pat. No. 5,410,422 (Bos), and U.S. Pat. No. 4,701,028 (Clerc et al.).

Optical compensators are disclosed in U.S. Pat. No. 5,583,679 (Ito et al.), U.S. Pat. No. 5,853,801 (Suga et al.), U.S. Pat. No. 5,619,352 (Koch et al.), U.S. Pat. No. 5,978,055 (Van De Witte et al.), U.S. Pat. No. 6,160,597 (Schadt et al.), U.S. Patent Application Publication 2002/0041352 A (Kuzuhara et al.), and European Patent Application Publication 1,143,271 A2 (Umeda et al.). A compensation film according to U.S. Pat. No. 5,583,679 (Ito et al.) and U.S. Pat. No. 5,853,801 (Suga et al.), based on discotic liquid crystals that have negative birefringence, is widely used. It offers improved contrast over wider viewing angles, however, it suffers larger color shift for gray level images, compared to a compensator made of liquid crystalline materials with positive birefringence, according to Satoh et al. ("Comparison of Nematic Hybrid and Discotic Hybrid Films as Viewing Angle Compensator for NW-TN-LCDs", SID 2000 Digest, pp. 347–349, (2000)).

To achieve improved performance in the contrast ratio while limiting color shift, one alternative is to use a pair of crossed liquid crystal polymer films (LCP) on each side of a liquid crystal cell, as discussed by Chen et al. ("Wide Viewing Angle Photoaligned Plastic Films", SID 99 Digest, pp. 98–101 1999). This paper states that "since the second liquid pre-polymer/LCP retarder film is coated directly on top of the first LCP retarder film, the total thickness of the final wide-view retarder stack is only a few microns thin." Although this method provides a very compact optical compensator, one of the challenges of this method is to make two LCP layers crossed, particularly in a continuous roll-to-roll manufacturing process.

U.S. Pat. No. 5,853,801 (Suga et al.) teaches a continuous process of preparing an optical compensator by, for example, coating a transparent resin layer on a transparent support, subjecting the layer to a brushing treatment to form an orientation layer, coating a solution of a discotic liquid crystal compound upon the orientation layer, drying the solution of the liquid crystal compound to form a coated layer, and heating the coated layer to form a discotic nematic phase.

In EP 646829 A1, the optical compensator is prepared by a process similar to that described in U.S. Pat. No. 5,853,801 but wherein the steps are performed discontinuously. Thus, the process is not suitable for high volume industrial production.

U.S. Pat. No. 5,995,184 (Chung et al.) discloses a compensation film wherein the film can be removed from a discrete substrate in a discontinuous process that is also unsuitable for high volume industrial production.

U.S. Pat. No. 6,160,597 (Schadt et al.) discloses steps for making an optical compensator using discontinuous or independent steps comprising drying, heating, and cooling treatments for periods as long as one hour or more, and therefore this process is also not suitable for high-volume industrial production.

A problem in the manufacture of optical compensators has been preventing the migration of performance-inhibiting species from the substrate to the optical compensator. Additionally, because of the stringent topographical uniformity requirements associated with optical compensators, the surface of an optical compensator must be free from imperfections typically incurred during manufacture and handling (i.e., scratches, pitting, etc.). Creation of optical compensators on very thin support is also a problem.

SUMMARY OF THE INVENTION

Briefly, according to one aspect of the present invention, a method for manufacturing an optical compensator on a transitional substrate is described. The method includes applying a first orientation layer to the transitional substrate, aligning the first orientation layer, and applying a first anisotropic liquid crystal material on the first orientation layer.

To eliminate chemical migration from a substrate to an optical compensator and to improve robustness of an optical compensator to handling and manufacturing processes, the optical compensator is prepared on a transitional substrate. The optical compensator is separated from the transitional substrate and used in a liquid crystal display device.

In one embodiment, the invention provides an improved process for making an optical compensator for use with liquid crystal displays, which process involves forming an orientation layer, sometimes referred to as an alignment layer, and an anisotropic nematic liquid crystal (LC) layer on a transitional substrate support made from polyethylene terephthalate (PET), polyethylene naphthalate (PEN), polycarbonate, glass, or other suitable material. Each aligning layer is aligned using a rubbing, photo-alignment, magnetic or other suitable aligning method to become the orientation surface (command surface) before the application of the next anisotropic layer. Finally, a substrate layer can be formed on top of the optical compensator. This layer can be triacetyl cellulose, polycarbonate, or other material satisfying the required optical properties.

The present process can be used to make an optical compensator film that widens the viewing angle characteristics of liquid crystal displays, and in particular of twisted nematic (TN), super twisted nematic (STN), optically compensated bend (OCB), in plane switching (IPS), or vertically aligned (VA) liquid crystal displays.

The invention and its objects and advantages will become more apparent in the detailed description of the preferred embodiment presented below.

DETAILED DESCRIPTION OF THE INVENTION

The present invention will be directed in particular to elements forming part of, or in cooperation more directly with the apparatus in accordance with the present invention. It is to be understood that elements not specifically shown or described may take various forms well known to those skilled in the art.

Figure 1:
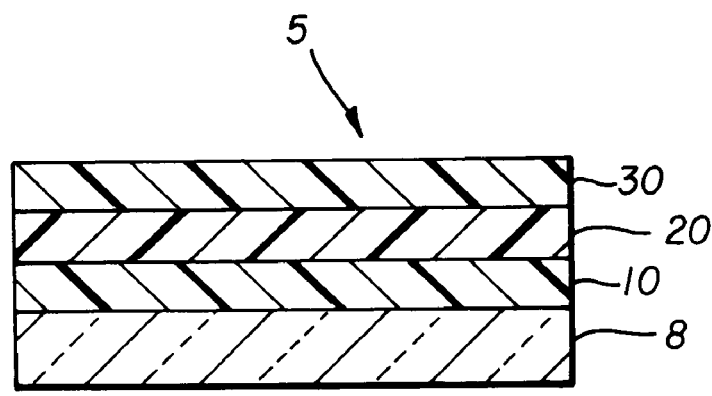
FIG. 1 is a cross-sectional schematic view of a compensator prepared by the process of the present invention.

The current invention regarding the optical compensator for liquid crystal displays is described by referring to the drawings as follows. FIG. 1 shows a cross-sectional schematic view of an optical compensator 5 which can be made according to the present invention. This compensator comprises a transitional substrate 8 of transparent material, such as glass or polymer. It should be understood that to be called as a transitional substrate, a layer must be solid and mechanically strong so that it can stand alone, and temporarily support other layers. A typical substrate is a support made of polyethylene terephthalate (PET), polyester, polycarbonate, polysulfone, polyethersulfone, or other polymers, and has a thickness of 25 to 500 micrometers. The substrate is preferably in the form of a continuous (rolled) support or web.

On the transitional substrate 8, a retardation layer 10 is applied. The retardation layer 10 typically has low in-plane retardation, preferably less than 10 nm, and more preferably less than 5 nm. In some other cases, the retardation layer 10 may have larger in-plane retardation between 15 to 150 nm. The retardation layer 10 is typically a polymeric material such as polystyrene, polycarbonate, or polyolefin. Blends of polymers or polymers containing fillers such as dyes or particulates can also be used as the retardation layer 10. Multiple retardation layers may be needed to achieve the desired functionality. A preferred material for the retardation layer is triacetyl cellulose (TAC). Typically, when the retardation layer 10 is made of TAC, it has out-of-plane retardation around −40 nm to −120 nm. This is a desired property when the compensator is designed to compensate a liquid crystal state with an ON voltage applied. The in-plane retardation discussed above is defined as the absolute value of $(n_x-n_y)d$ and the out-of-plane retardation discussed above is defined as $[n_z-(n_x+n_y)/2]d$, respectively. The refractive indices $n_x$ and $n_y$ are along the slow and fast axes in plane of the substrate, respectively, $n_z$ is the refractive index along the substrate thickness direction (Z-axis), and d is the substrate thickness.

On the retardation layer 10, an orientation layer 20, sometimes referred to an alignment layer, is applied, and an anisotropic layer 30 is disposed on top of orientation layer 20. Optionally, between the retardation layer 10 and the orientation layer 20, a compliant layer and a barrier layer can be applied (compliant layer and barrier layer not shown in FIG. 1). Barrier layers are disclosed in copending U.S. patent application Ser. No. 10/194,162 (Nair et al.) and Ser. No. 10/194,130 (Bauer et al.) and compliant layers are disclosed in copending U.S. patent application Ser. No. 10/390,123 (Nair et. al.), hereby incorporated by reference in their entirety.

The orientation layer 20 can be oriented by various techniques. In one example, the orientation layer contains a rubbing-orientable material such as a polyimide or a polyvinyl alcohol and can be oriented by a rubbing technique. In another example, the orientation layer contains a shear-orientable material and can be oriented by a shear-alignment technique. In another example, the orientation layer contains an electrically or magnetically orientable material and can be oriented by an electrical or magnetic alignment technique. In another example, the orientation layer can also be a layer of SiOx fabricated by oblique deposition. In another example, the orientation layer contains a photo-orientable material and can be oriented by a photo-alignment technique. Photo-orientable materials include, for example, photo isomerization polymers, photo dimerization polymers, and photo decomposition polymers. In a preferred embodiment, the photo-orientable materials are cinnamic acid derivatives as disclosed in U.S. Pat. No. 6,160,597. Such materials may be oriented and simultaneously crosslinked by selective irradiation with linear polarized UV light.

In a preferred embodiment, the anisotropic layer 30 is typically a liquid crystalline monomer when it is first disposed on the orientation layer 20, and is crosslinked or polymerized by a further UV irradiation, or by other means such as heat. In a preferred embodiment, the anisotropic layer contains a material such as a diacrylate or diepoxide with positive birefringence as disclosed in U.S. Pat. No. 6,160,597 (Schadt et al.) and U.S. Pat. No. 5,602,661 (Schadt et al.). The optic axis in the anisotropic layer 30 is usually tilted relative to the layer plane, and varies across the thickness direction.

To one skilled in the art, the layer of optically anisotropic compound can be prepared by coating a calamitic liquid crystal compound having a nematic phase (and other compounds if desired) in a solvent on the orientation layer, drying, heating, cooling to the temperature for forming a positive birefringence nematic phase and, polymerizing the coated layer (e.g., by radiation of UV light). In another embodiment, the layer of optically anisotropic compound can be prepared by forming a solution of a discotic liquid crystal compound (and other compounds if desired) in a solvent and disposing said solution on the orientation layer, drying, heating to the temperature for forming a negative birefringence nematic phase and, polymerizing the coating (e.g., by radiation of UV light).

The temperature at which the liquid crystal compound undergoes a phase transition between the nematic phase and the isotropic phase is defined as the transition temperature $T_c$ (also referred to as the clearing temperature).

While the type of compensator described above provides some desired optical properties, additional layers are necessary for wide viewing-angle compensation, for example, in a compensator for twisted nematic (TN) liquid crystal displays (LCDs).

The anisotropic layer may also contain addenda such as surfactants, light stabilizers and UV initiators. UV initiators include materials such as benzophenone and acetophenone and their derivatives; benzoin, benzoin ethers, benzil, benzil ketals, fluorenone, xanthanone, alpha and beta naphthyl carbonyl compounds and various ketones. Preferred initiators are alpha-hydroxyketones.

The anisotropic layer may also contain curable and/or polymerizable addenda such as di or triacrylate monomers, in addition to or instead of a polymerizable liquid crystalline material.

Figure 2A:
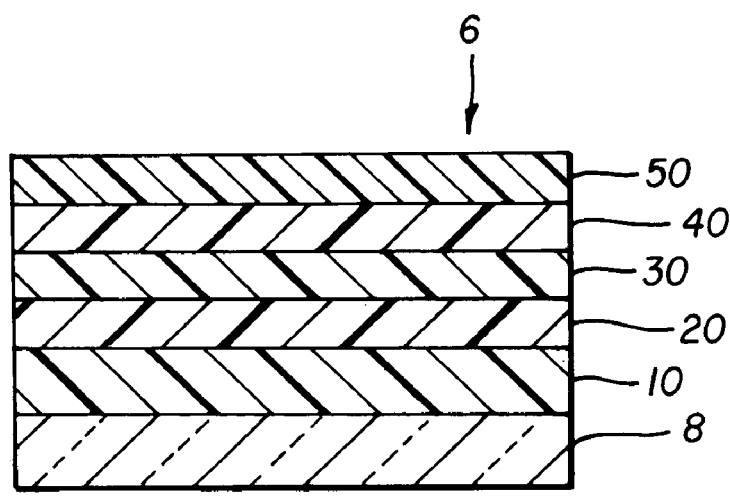
FIGS. 2A and 2B are cross-sectional schematic views of various embodiments prepared by the process of the present invention.
Figure 3:
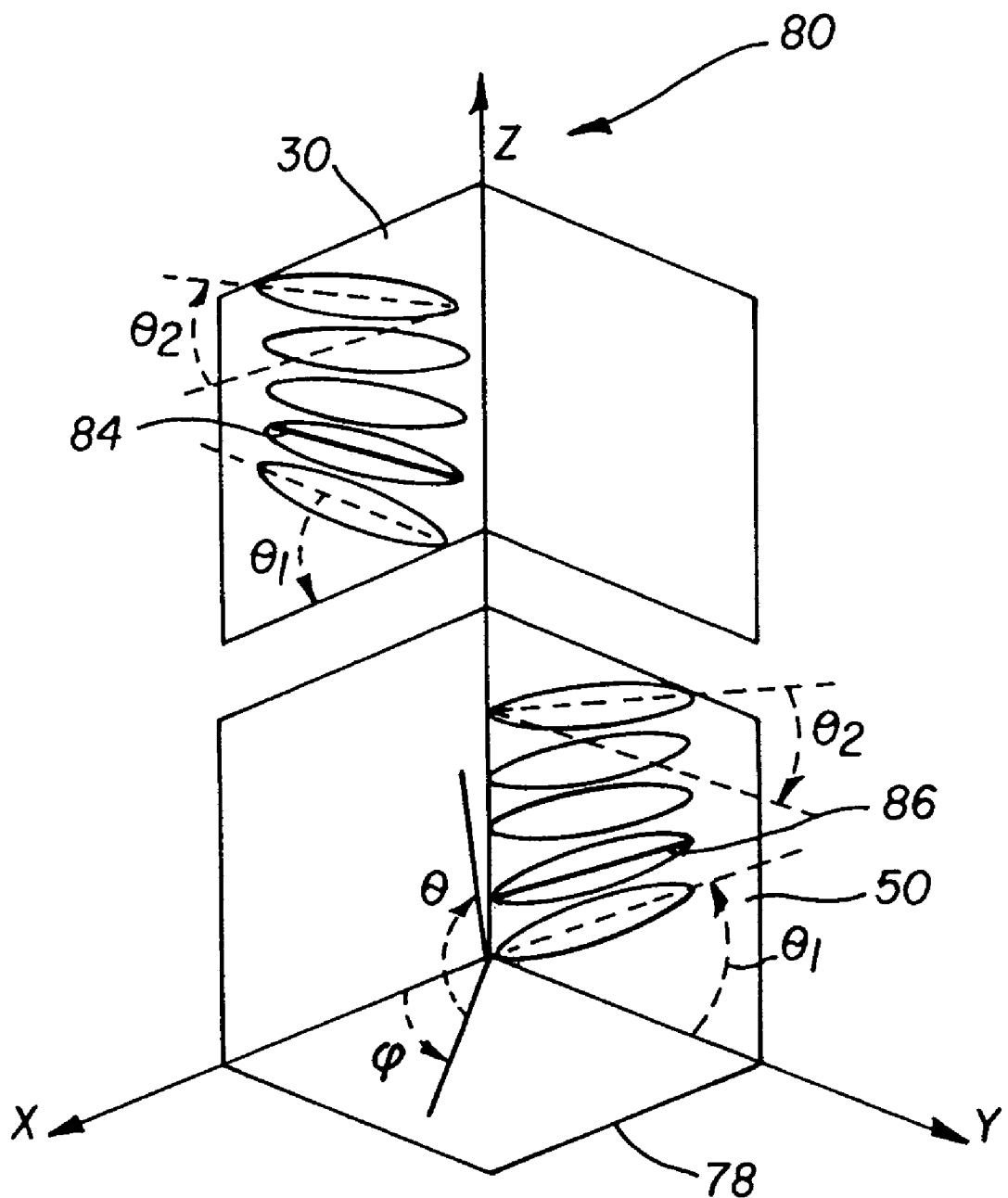
FIG. 3 is a schematic view in accordance with the present invention.

FIG. 2A illustrates a more sophisticated optical compensator 6 that may be made in accordance with the present invention, which compensator contains a second orientation layer 40 and a second anisotropic layer 50 on top of the first anisotropic layer 30. The second orientation layer 40 and the second anisotropic layer 50 may be made in the same way as the first orientation layer 20 and the first anisotropic layer 30 are made, except that the direction of the orientation may vary. For the purpose of illustration, refer to an XYZ coordinate system 80 as shown in FIG. 3. The X and Y-axes are parallel to the plane of substrate 78, and the Z-axis is perpendicular to the plane of substrate 78. The angle $\phi$ is measured from the X-axis in the XY plane, and referred as an azimuthal angle. The angle $\theta$ is measured from the XY plane, and referred as a tilt angle.

It should be understood that the optical axis in each of the anisotropic layers 30 and 50 could have a variable tilt angle and/or variable azimuthal angle. For example, the optic axis 84 in the anisotropic layer 30 has a variable tilt angle $\theta$ across the Z-axis ranging from $\theta_1$ to $\theta_2$. In another example, the optic axis 84 has a fixed tilt angle $\theta$ across the Z-axis, namely, $\theta_1=\theta_2$. In another example, the optic axis 84 is contained in one plane such as the XZ plane and consequently has a fixed azimuthal angle $\phi$ across the Z-axis. In another example, although the anisotropic layer 30 is still oriented along the preferred direction forced by the orientation layer at their interface, the optic axis 84 has a variable azimuthal angle $\phi$ across the Z-axis. The azimuthal angle of the optic axis 84 can be varied by adding a proper amount of chiral dopant into the anisotropic layer 30. In another example, the optic axis 84 has a variable tilt angle $\theta$ and a variable azimuthal angle $\phi$ across the Z-axis. Like the optic axis 84 of the anisotropic layer 30, the optic axis 86 of the second anisotropic layer 50 can also have a fixed tilt angle, a variable tilt angle, a fixed azimuthal angle, a variable azimuthal angle, or a variable tilt angle and a variable azimuthal angle across the Z-axis. The anisotropic layers 30 and 50 typically have different optic axis. Preferably the anisotropic layer 30 is positioned orthogonally relative to the respective optic axis of the second anisotropic layer 50 about an axis perpendicular to the plane of the substrate. Even though the optic axis of the anisotropic layer 30 is preferred to be orthogonal (or ±90 degrees) relative to the respective (or counterpart) optic axis of the second anisotropic layer 50 about an axis perpendicular to the plane of the substrate, it should be understood that the angle between the optic axis of the two anisotropic layers can be in a range of 85 to 95 degrees to be considered as orthogonal.

For the manufacture of more complex layer structures than that illustrated in FIG. 2A, additional orientation and anisotropic layers can be applied in further steps.

Figure 2B:
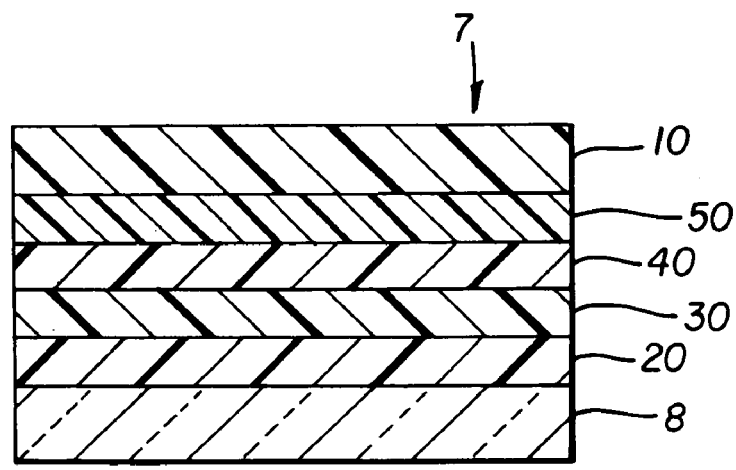

FIG. 2B illustrates another optical compensator 7 manufacturable by the inventive process in which the first orientation layer 20 is applied directly to the transitional substrate. The first anisotropic layer is then applied to the first anisotropic layer 30. The second orientation layer 40 and the second anisotropic layer 50 are then subsequently applied. The retardation layer 10 is applied to the second anisotropic layer 50.

Figure 5:
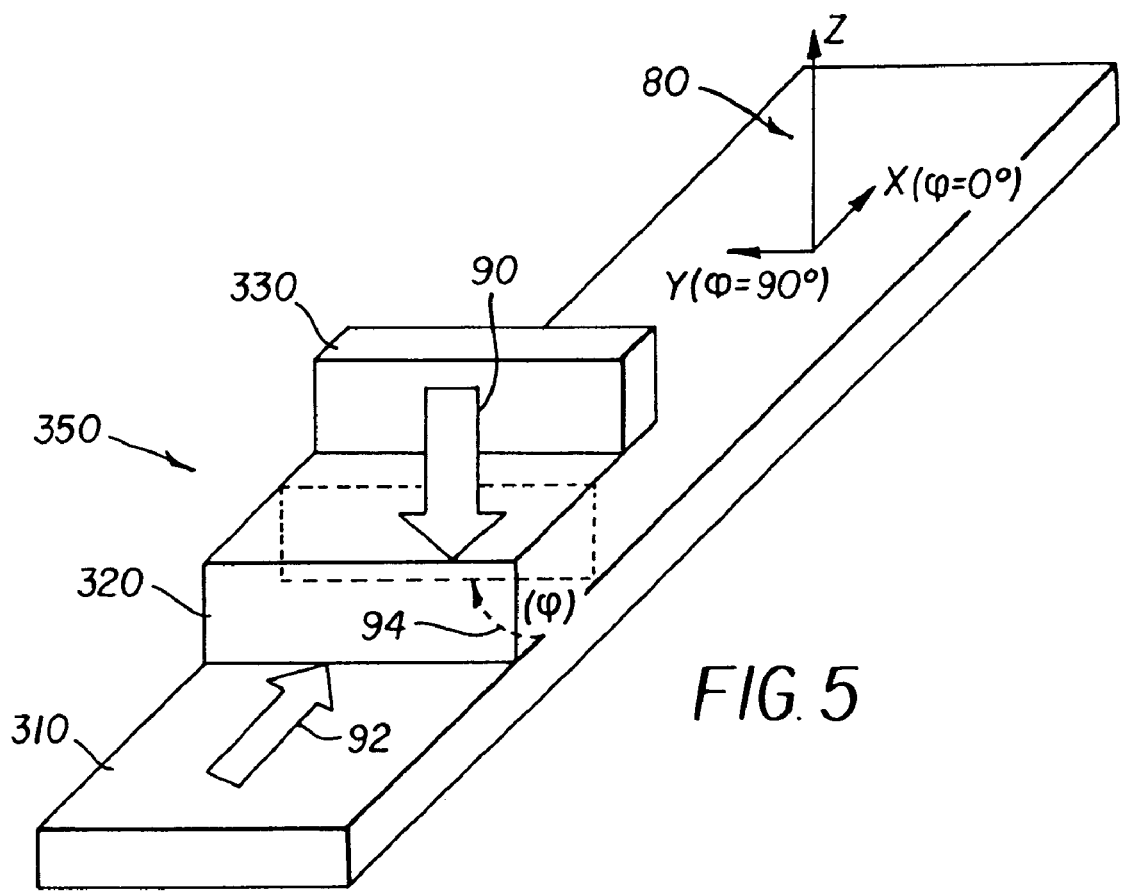
FIG. 5 shows a roll-to-roll process for making a compensator according to the present invention.

According to another aspect of the present invention, a compensator 350 can be manufactured on a roll-to-roll basis as shown in FIG. 5, which shows part of a schematic view of the process. The roll-to-roll process of forming a compensator 350 comprises the steps of applying an orientation layer 320, for example by coating the orientable material in a solvent, onto a moving transitional substrate with a retardation layer thereon 310, drying the orientation layer 320, orienting the orientation layer 320 in a predetermined alignment direction ($\phi$94, (for example ($\phi$ can equal 0° to 90°) relative to the roll moving direction 92, roll coating an anisotropic layer 330 including a polymerizable material in a solvent carrier onto the orientation layer 320, drying the anisotropic layer 330, polymerizing the anisotropic layer 330 to form a continuous web of compensator. Note that for clarity, FIG. 5 only shows part of the orientation layer 320 and anisotropic layer 330.

In one embodiment of the present invention, the orientation layer is oriented by rubbing the orientation layer in a direction 94 of 90 degrees ($\phi=90°$) relative to the roll moving direction 92. In another embodiment, the orientation layer is oriented by a photo-alignment technique; for example, the orientation layer is exposed to a linearly polarized ultraviolet (UV) light indicated by 90. It may or may not be collimated, however, the projection (pointing along 94) of the principal ray of the light 90 onto the roll makes an angle of about 90 degrees relative to the roll moving direction.

Figure 4:
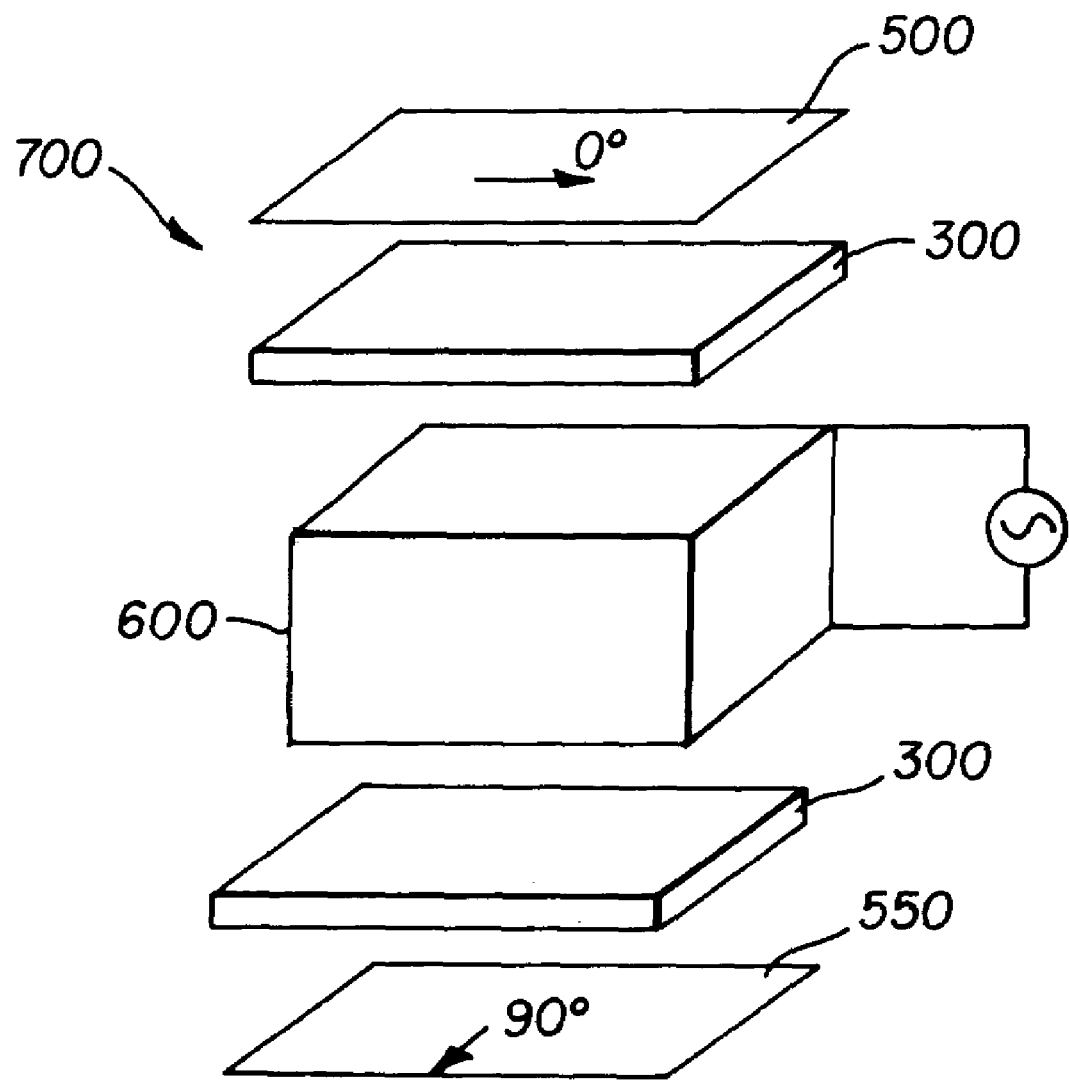
FIG. 4 shows a liquid crystal display in combination with a compensator prepared according to the present invention.

FIG. 4 is a schematic view of a liquid crystal display 700 comprising the compensator 300, also manufacturable in accordance with the present invention. In FIG. 4, one compensator 300 is placed between the first polarizer 500 and the liquid crystal cell 600, and another compensator 300 is placed between a second polarizer 550 and the liquid crystal cell 600. The liquid crystal cell 600 is preferred to be operated in a twisted nematic (TN), super twisted nematic (STN), optically compensated bend (OCB), in plane switching (IPS), or vertically aligned (VA) mode. The polarizers 550 and 500 can be arranged crossed or parallel depending on the operation principles of the liquid crystal cell. The orientation layer in the compensator can be arranged parallel, perpendicular, or at a predetermined angle relative to the first polarizer 500. The liquid crystal cell can also be operated in a reflective mode, in which it may only require one polarizer.

The compensators made by the present invention may be used in conjunction with electronic imaging device comprising a liquid crystal display device. The energy required to achieve the display device is generally much less than that required for the luminescent materials used in other display types such as cathode ray tubes. Accordingly, liquid crystal display technology is used for a number of applications, including but not limited to digital watches, calculators, portable computers, electronic games for which light weight, low power consumption and long operating life are important features.

In one preferred embodiment for making an optical compensator, the orientation layer can be disposed on a continuous transitional substrate with a retardation layer thereon. Preferably, the orientation layer contains a photo-orientable material such as cinnamic acid derivatives that can be oriented by a photo-alignment technique. The solvent can include a mixture of organic solvents such as MEK, cyclohexane and isopropyl acetate. After the orientation effect is achieved by linear polarized UV light, a mixture of liquid crystalline monomers such as diacrylates, UV initiator and solvent is applied onto the orientation layer. The solvent then evaporates and liquid crystalline monomers are crosslinked and/or cured by UV irradiation.

In a preferred process of making an optical compensator, the steps are continuously performed (i.e., performed in nonstop process). Further, it is preferred that the steps extending from the step of feeding the transparent transitional substrate to the orientation treatment are continuously performed. The process can be, for example, performed according to the following steps:

a) coating a liquid composition, comprising a polymer, preferably TAC, in a solvent onto a transitional substrate;

b) drying the polymer containing coating forming a retardation layer, preferably with heated gas, to vaporize solvent;

c) coating a liquid composition, comprising a photo-alignable resin in a solvent, to form a resin-containing coating on a transitional substrate with a retardation layer thereon;

d) drying the resin-containing coating, preferably with heated gas, to vaporize solvent;

e) orienting the orientation layer in a predetermined direction, preferably by rubbing or photo-alignment;

f) coating a liquid crystal compound having liquid crystalline properties in a solvent carrier onto the orientation layer;

g) drying the liquid crystal containing coating;

h) thermally treating the liquid crystal-containing layer until the entire layer reaches the functionally oriented phase (preferably a nematic phase) forming an anisotropic liquid crystal layer; and i) solidifying the anisotropic liquid crystal layer.

The latter step preferably comprises cooling to solidify or curing (in the case of using as the compound an anisotropic material having a polymerizable or crosslinkable group) with light or heat energy and cooling the layer.

Optionally, the transitional substrate having the retardation layer, the orientation layer and the anisotropic liquid crystal layer can be wound and stored imparting a degree of protection not available without the transitional substrate. Before use, the transitional substrate is then separated from the compensation film and recycled or discarded.

In another embodiment of the present invention, the orientation layer and the anisotropic liquid crystal layer can be coated directly onto the transitional substrate or the transitional substrate with a barrier layer or layers thereon in a continuous manufacturing process. Two supply rolls from this process can then be bonded together by a roll-to-roll laminator to form one roll of optical compensator with transitional substrates protecting the optical layers. The two rolls of components can be bonded together at the anisotropic layers of the two components. In this embodiment, the optic axis of the anisotropic layer in one component is positioned orthogonally relative to the respective optic axis of the anisotropic layer in the other about an axis perpendicular to the plane of the substrates. Prior to use, the transitional substrates are then removed to form an ultra thin compensation film.

An alternate embodiment of the invention comprises coating a polymerizable monomer layer (and other components) onto the transitional substrate and illuminating the monomer layer with actinic radiation to polymerize the layer thus forming a cured retardation layer.

One embodiment of the invention comprises repeating the above steps in series to form a plurality of orientation layers and a plurality of anisotropic layers to form an integral component wherein the optical axis of each anisotropic layer is positioned relative to the respective optical axis of the other anisotropic layers by some small angle about an axis perpendicular to the plane of the substrates. Preferably, there are a first and second orientation layer and a first and second anisotropic layer to form an integral component so that the optical axis of the first anisotropic layer is positioned orthogonally relative to the respective optical axis of the second anisotropic layer about an axis perpendicular to the plane of the substrate (transparent film), obtained either by coating in series or in parallel.

An alternate embodiment of the invention comprises coating a plurality of orientation layers and a plurality of anisotropic layers directly onto the transitional substrate or the transitional substrate with a barrier layer or layers thereon in a continuous manufacturing process. The final anisotropic layer is then adhered to another permanent substrate such as TAC, cyclic polyolefin, glass, etc. in a roll-to-roll manufacturing process. The transitional substrate is then separated from the plurality of orientation and anisotropic layers now attached to a permanent support in order to form an optical compensator.

Figure 6:
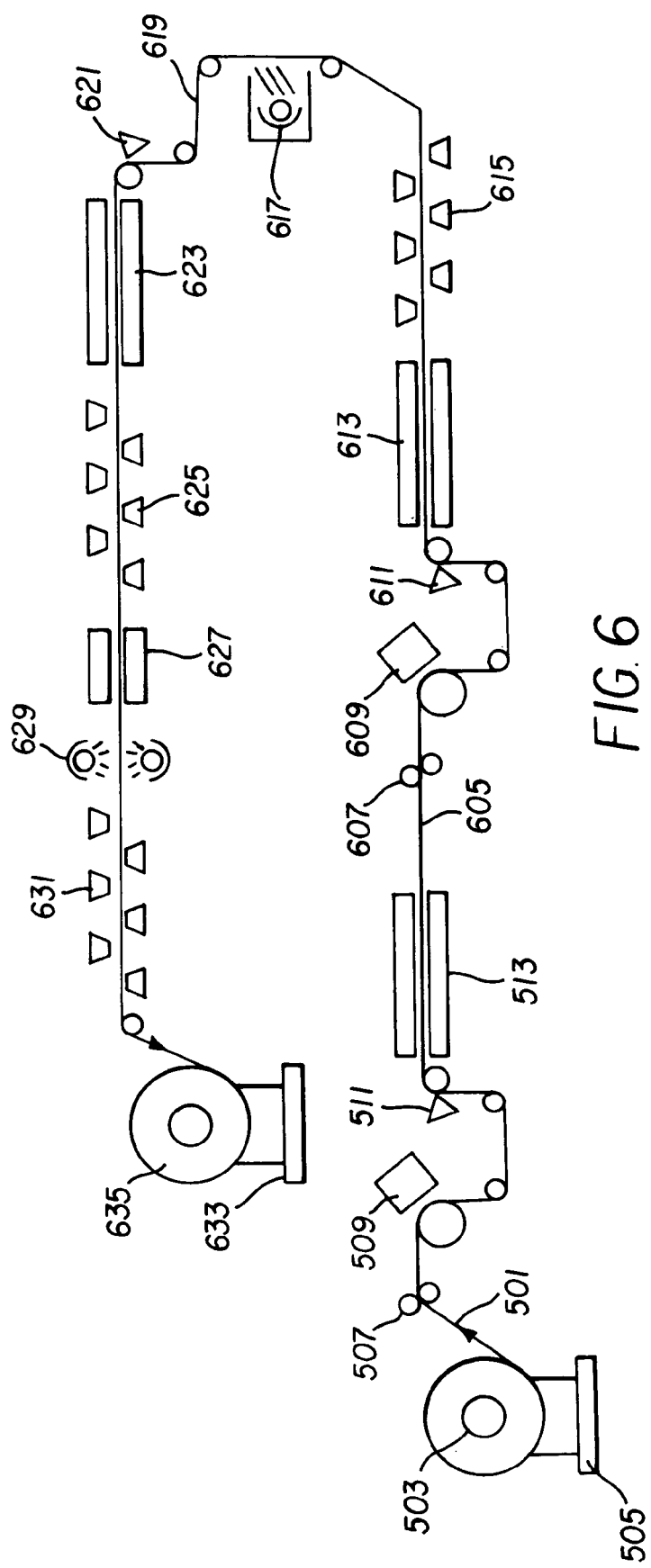
FIG. 6 shows one embodiment of a process for making a two-layer system on a transitional substrate with a retardation layer thereon comprising a single orientation layer and a single anisotropic liquid crystal layer.

The processes of the invention are explained in detail referring to the attached figures. FIG. 6 schematically shows an example of the process for the preparation of the continuous optical compensator film of the invention. The continuous transitional substrate 501 is fed from a roll of continuous film 503 using a delivery machine 505 having a driver means. Optionally dust on a surface of the film can be removed using a surface dust-removing machine 507. A web treatment (Corona discharge, glow discharge, particle transfer roll, etc.) can be performed by apparatus 509. The continuous transitional substrate is moved using a driving roller toward a coating machine 511. A coating liquid of a resin for forming a retardation layer in a solvent is coated using a coating machine 511 on the surface of the transitional substrate. The coated layer is then dried in a drying unit 513 to form a transparent resin orientable layer on the film. Drying can be accomplished by IR, conduction, air convection, microwave, etc. The transitional substrate with the retardation layer thereon 605 is moved toward a coating machine 611. Optionally dust on a surface of the film can be removed using a surface dust-removing machine 607. An optional web treatment (Corona discharge, glow discharge, particle transfer roll, etc.) can also be performed by web treatment device 609. A coating liquid of a resin for forming an orientation layer in a solvent is coated using a coating machine 611 on the surface of the film. The coated layer is then dried in a drying unit 613 to form a transparent resin orientable layer on the film. Drying can be accomplished by IR, conduction, air convection, microwave, etc. The transitional substrate having the retardation layer and the orientable resin layer is then subjected to ultraviolet light using a polarized ultraviolet light source 617 to form an orientation layer. A heat treatment can be applied before 615 or after 619 the polarized ultraviolet light source 617.

The continuous transitional substrate having the retardation layer and orientation layer thereon is moved using a driving roller toward a coating machine 621. A coating liquid of a liquid crystal compound having liquid crystalline property in a solvent is coated on the orientation layer using the coating machine 621 to form a coated layer. Subsequently, the solvent in the coated layer is vaporized in a dryer 623, and the coated layer is optionally heated, in a heating section 625. Again the heating and drying means can utilize IR, conduction, air convection, etc.

The coated anisotropic liquid crystal compound on top of the oriented resin layer is then thermally treated 627 to form a nematic phase resulting either in a positive birefringence layer or a negative birefringence layer. Preferably, the anisotropic liquid crystal polymer compound is cooled to form a positive birefringence nematic phase. Optionally, the nematic compound can be cooled further in a cooling unit prior to solidification or curing.

In one embodiment, the anisotropic layer is exposed to ultraviolet light (UV light) emitted by UV lamp 629, which can be a non-polarized flood light, to form a cured layer. In the case that a non-polymerizable anisotropic liquid crystal compound is used, the anisotropic layer is cooled after heating to solidify the liquid crystal. The anisotropic layer is generally cooled rapidly so as not to destroy the oriented liquid crystal phase.

Subsequently, an optional heat treatment can by applied 631 in order to stress relax the transparent film having the orientation layer and further promote adhesion. The composite film is wound up in roll 635 by a wind-up machine 633.

In another embodiment of the invention, the orientable resin layer is applied directly to the transitional substrate. Once dried and aligned, a coating liquid of a liquid crystal compound having liquid crystalline property in a solvent is coated on the orientation layer, dried, and solidified to form an anisotropic liquid crystal layer. Subsequently, a retardation layer, preferably TAC, is coated on top of the anisotropic liquid crystal layer prior to winding.

The liquid coatings in the described process steps can be applied using slide coating, slot coating, gravure coating, roll coating, etc. as described in *Liquid Film Coating*, ed. Kistler and Schweizer, Chapman and Hall, 1997.

By the process for the preparation of an optical compensator described above, a continuous optical compensator film can be efficiently prepared on a transitional substrate. Therefore, the process of the invention is suitable for a process for industrial preparation of the sheet or for mass production of the sheet.

The layer of optically anisotropic compound having a nematic phase is formed on the orientation layer, the retardation layer, and the transitional substrate. Preferably, the orientation layer is obtained by exposing a photo-alignable resin to polarized ultraviolet light and then, optionally, heat treating to achieve the desired tilt and alignment angles. The layer of optically anisotropic compound is obtained by orienting the coated layer of compound and cooling, or by orienting the coated layer of compound having polymerizable group and curing, and the layer of compound has a positive or a negative birefringence.

To one skilled in the art, the layer of optically anisotropic compound can be prepared by forming a solution of a liquid crystal compound (and other compounds if desired) in a solvent and disposing said solution on the orientation layer, drying, heating, cooling to the temperature for forming a positive birefringence nematic phase and, polymerizing the coated layer (e.g., by radiation of UV light). In another embodiment, the layer of optically anisotropic compound can be prepared by forming a solution of a discotic liquid crystal compound (and other compounds if desired) in a solvent and disposing said solution on the orientation layer, drying, heating to the temperature for forming a negative birefringence nematic phase, and polymerizing the coating (e.g., by radiation of UV light).

The entire contents of the patents and other publications referred to in this specification are incorporated herein by reference. The present invention is illustrated in more detail by the following non-limiting examples.

EXAMPLE 1

Experimentation was performed to investigate the effects of a transitional substrate on the optical properties of a compensation film using the described coated layers on the transitional substrate.

To prepare samples, first a polyethylene terephthalate (PET) transitional substrate was coated with a triacetyl cellulose (TAC) solution. A coating with the following composition was applied to the PET support to form the first two samples:

62.15% 1,3-dioxolane
20.71% methyl acetate
9.21% methanol
0.02% Tinuvin 622 (a light stabilizer available from Ciba Specialty Chemical)
0.02% Epon 815C (an epoxy resin from Resolution Performance Products)
6.01% cellulose triacetate
0.88% triphenyl phosphate
0.88% methylene chloride
0.06% Surflon S8405 (a fluoro(meth)acrylate polymer surfactant available from Siemi Chemical)
0.06% ethyl acetate This solution was applied to the transitional substrate at a wet coverage of 358.4 g/m$^2$ and dried. These samples were labeled A and B.

Two more PET samples were coated with a different TAC solution of the following composition:
62.74% 1,3-dioxolane
20.92% methyl acetate
9.29% methanol
0.02% Tinuvin 622
0.02% Epon 815C
6.01% cellulose triacetate
0.88% diethyl phthalate
0.06% Surflon S8405
0.06% ethyl acetate This solution was applied to the transitional substrate at a wet coverage of 358.4 g/m$^2$ and dried. These samples were labeled C and D.

A fifth PET sample was coated with the following TAC composition:
63.75% 1,3-dioxolane
21.25% methyl acetate
9.44% methanol
5.44% cellulose triacetate
0.04% DC190 (a silicone surfactant available from Dow Corning)
0.04% Surflon S8405
0.04% ethyl acetate This composition was applied to the PET substrate at a wet coverage of 117.2 g/m$^2$. This sample was labeled E.

A sixth sample was prepared by first coating Butvar B76 (a polyvinyl butyral available from Monsanto) at a dry coverage of 5380 mg/m$^2$ on the PET transitional support to modify the adhesion between the TAC film and PET transitional support. Subsequently, the following TAC composition was coated on top of the polyvinyl butyral layer on the PET transitional support: 63.73% 1,3-dioxolane
21.24% methyl acetate
9.43% methanol
5.44% cellulose triacetate
0.08% Surflon S8405
0.08% ethyl acetate This TAC coating was applied at 117.2 g/m2 and dried. This sample was labeled F.

A seventh PET sample was not coated with a TAC solution. This sample was labeled G. On top of samples A and C, a subbing solution of the following composition was coated:
70.16% acetone
27.17% methanol
1.31% water
0.15% isopropanol
0.35% cellulose nitrate
0.71% gelatin
0.14% salicylic acid This solution was applied to the TAC support at a wet coverage of 18.1 g/m$^2$ and dried. To this was applied a layer of gelatin at 2.2 g/m$^2$ dry coverage.

Samples A through G were then coated with a photo-alignable orientation layer from the following solution at a wet coverage of 16.5 g/m$^2$:
23.30% Staralign® 2110MEK (10% active, polyvinyl cinnamate polymer), commercially available from Vantico:
13.95% methyl ethyl ketone
22.75% cyclohexanone
40.00% n-propyl acetate After drying to remove solvents, samples were exposed to linearly polarized UVB light at a 20-degree angle. Upon the aligned orientation layer, a solution of a diacrylate nematic liquid crystal with photoinitiator (Irgacure® 369 photoinitiator from Ciba) was coated at a wet coverage of 9.33 g/m2 and dried to form the anisotropic liquid crystal layer. After drying, samples were heat treated to allow for formation of the required nematic liquid crystal phase.

All samples were then exposed to 320 mJ/cm$^2$ of UVA light to crosslink the anisotropic nematic liquid crystal layer. The base diacrylate nematic liquid crystal material coating solution is as follows:
29.00% Opalva 2130 MEK30 (30% active, prepolymer, supplied with photoinitiator) from Vantico
62.00% Toluene
9.00% ethyl acetate On top of samples A and C an additional TAC solution of the following composition was coated and dried:
62.75% 1,3-dioxolane
20.91% methyl acetate
9.30% methanol
0.02% Tinuvin 622
0.02% Epon 815C
6.00% cellulose triacetate
0.88% diethyl phthalate
0.06% Surflon S8405
0.06% ethyl acetate This coating was applied to samples A and C at a wet coverage of 358.4 g/m$^2$ and dried.

On top of sample G, an additional TAC coating of the following composition was applied:
63.02% 1,3-dioxolane
21.00% methyl acetate
9.33% methanol
0.02% Tinuvin 622
0.02% Epon 815C
5.65% cellulose triacetate
0.82% diethyl phthalate
0.07% Surflon S8405
0.07% ethyl acetate This coating was applied to samples G at a wet coverage of 196.3 g/m$^2$ and dried.

For all samples, the PET transitional substrate was then separated from the subsequently applied layers prior to testing.

The tilt angle of the anisotropic layer was measured by ellipsometry (J. A. Woollam Co., Model M2000V). The measurement precision of the average tilt angle was ±2.0 degrees. The contrast ratio (ratio of bright state intensity to dark state intensity when the compensation film is rotated between crossed polarizers with backlighting) of the sample was also measured. Experimental data is summarized in Table 1, which contains the average tilt angle measurements and the contrast ratio for bright versus dark state intensities for all tested samples.

TABLE 1

| Sample | Tilt Angle (degrees) | Contrast Ratio |
|---|---|---|
| A | 26 | 28.0 |
| B | 11 | 1.4 |
| C | 25 | 19.0 |
| D | 14 | 1.2 |
| E | 14 | 3.4 |
| F | 15 | 3.6 |
| G | 26 | 6.0 |

The data in Table 1 illustrate the utility of the invention in that optically functional films were prepared on transitional substrate and then removed from the support for subsequent use. The data also demonstrate the inclusion of additional barrier layers such as gelatin on top of the retardation layer (samples A and C) can improve or alter the tilt angle and contrast ratio. The data also demonstrates that coating the alignable orientation layer and the anisotropic layer directly on a transitional PET support enables removal of the barrier layer without degradation of the desired optical tilt angle. In sample G, the contrast ratio is diminished by defects caused by non-optimal removal of the transitional substrate. The data also demonstrate the utility of the invention in that optically active compensation films were created with a thickness less than 30 microns.

EXAMPLE 2

Experimentation was performed to investigate the effects of a transitional substrate on the scratch propensity of a compensation film using the described coated layers on the transitional substrate. A sample was prepared in a similar fashion to samples described in Example 1. This sample was labeled A. A second sample was prepared in a similar fashion except that the optical layers were coated directly onto an 80-micron thick TAC substrate. No transitional substrate was used. This sample was labeled B. Once the PET transitional substrate was removed from Sample A, the samples were visually compared at magnifications from 1× to 200× using an OLYMPUS Microscope (model BH2). Sample A had no scratches when observed at 1× up to 200× magnification. Sample B showed very severe scratches visible using no magnification, and had numerous deep scratches when observed under magnification.

The observational data described here illustrates the utility of the invention in that optically functional films were protected from manufacturing process related damage via preparation on a transitional substrate.

EXAMPLE 3

This example describes the evaluation of separating a film from a transitional substrate, such as the film and transitional substrate used for the preparation of a compensation film as described by this invention.

For this demonstration, four films are considered. To form each of the films, a polyethylene terephthalate (PET) transitional substrate is coated with triacetyl cellulose (TAC) compositions.

The first two samples were prepared by applying a coating of the following composition:

62.14% 1,3-dioxolane
20.71% methyl acetate
9.21% methanol
0.02% Tinuvin 622 (a light stabilizer available from Ciba Specialty Chemical)
0.02% Epon 815C (an epoxy resin from Resolution Performance Products)
6.01% cellulose triacetate
0.88% triphenyl phosphate
0.88% methylene chloride
0.06% Surflon S8405 (a fluoro(meth)acrylate polymer surfactant available from Siemi Chemical)
0.06% ethyl acetate This solution was applied to the transitional substrate at a wet coverage of 358.4 g/m² and dried. These samples were labeled A and B.

Two more PET supports were coated in the same manner but with a different TAC composition as follows:

62.73% 1,3-dioxolane
20.91% methyl acetate
9.29% methanol
0.02% Tinuvin 622
0.02% Epon 815C
6.01% cellulose triacetate
0.88% diethyl phthalate
0.06% Surflon S8405
0.06% ethyl acetate These samples were labeled C and D.

On top of sample A and C, a subbing solution of the following composition was coated:

70.16% acetone
27.17% methanol
1.31% water
0.15% isopropanol
0.35% cellulose nitrate
0.71% gelatin
0.14% salicylic acid This solution was applied to the TAC coating at a wet coverage of 18.1 g/m² and dried.

Evaluation of the peeling forces required to separate the film from the transitional substrate was accomplished using an MTS Sintech 1/G tensile tester. For these tests, the apparatus was equipped with a 25 N load cell and the rate of separation of the head and clamp holding the sample was set at 2 inches per minute. The samples were prepared for testing by cutting strips of the transitional support with TAC coating that were 1 inch wide and approximately 4 to 5 inches in length. Peeling of the TAC film was initiated by either rubbing the edge or by placing a piece of tape on the coated side and pulling the TAC film away from the PET support. After the TAC film peeling was initiated, a leader made-up of Scotch® Magic™ tape was applied to the free end of the TAC film. The sample was then loaded into the jaws of the tensile tester apparatus such that peeling of the TAC from the PET transitional support was accomplished at 180 degrees. After completion of the measurement run, a load average stress was reported.

TABLE 2

| Sample | Load Average Stress, N/m |
|---|---|
| A | 3.7 |
| B | 2.0 |

TABLE 2-continued

| Sample | Load Average Stress, N/m |
|---|---|
| C | 9.4 |
| D | 6.1 |

Experience in studying films coated on transitional supports has shown varying quality of film after peeling depending upon the value of the load average stress measured in this fashion.

Some films produced for testing are difficult to remove from the transitional support and therefore when testing is undertaken in the manner described above, the film cannot be initially separated from the transitional support in order to apply the leader tape. In such cases, the sample is prepared in an alternate manner by applying a leader tape directly to the surface of the film and applying a second leader tape to the underside of the transitional support. When the sample prepared in this way is placed in the tensile testing apparatus and the testing run performed, the film is not separated from the transitional support but adhesive failure is noted at the bond between the film or support and the leader tape itself. In cases such as this, a load average stress in excess of 75 N/m is typically measured. Because of the adhesive failure of the tape, the true peeling force for removal of the film from the transitional support is unknown, but it is assumed to be greater than that measured for the tape/film bond. Films which behave in this way have not been considered for use in forming a compensation film.

Films with load average stress values less than 75 N/m but greater than 10 N/m exhibit varied behavior. Some films tend to rip or tear as separation of the film from the support occurs. Other films tend to form a continuous sheet with chatter lines due to the separation being rough or discontinuous. In still other cases, good separation behavior is seen resulting in a continuous sheet free of chatter lines. Therefore, some films produced with load average stresses less than 75 N/m but greater than 10 N/m are useful for optical applications such as forming a compensation film.

Films which possess a load average stress less than 10 N/m tend to peel very smoothly separating from the transitional support in a continuous sheet without any rough motion and free of chatter lines. Such films are ideal for use in optical applications such as the formation of a compensation film.

The film samples presented in Table 2 all possess load average stress values less than 10 N/m and therefore are considered excellent films for use in forming a compensation film.

The invention has been described in detail with particular reference to certain preferred embodiments thereof, but it will be understood that variations and modifications can be effected within the scope of the invention.

PARTS LIST 5 optical compensator
6 optical compensator
7 optical compensator
8 transitional substrate
10 retardation layer
20 orientation layer
30 anisotropic layer
40 second orientation layer
50 second anisotropic layer
78 plane of substrate (or XY plane)
80 XYZ coordinate system
84 optic axis in the anisotropic layer 30
86 optic axis in the anisotropic layer 50
90 UV light
92 roll moving direction
94 alignment direction
300 compensator
310 moving substrate with TAC retardation layer thereon
320 orientation layer
330 anisotropic layer
350 compensator
500 first polarizer
501 transitional substrate
503 roll of continuous film
505 delivery machine
507 dust-removing machine
509 web treatment device
511 coating machine
513 drying unit
550 second polarizer
600 liquid crystal cell
605 transitional substrate with retardation layer thereon
607 dust-removing device
609 web treatment device
611 coating machine
613 drying unit
615 optional heating unit
617 polarized ultraviolet light source
619 optional heating unit
621 coating machine
623 drying unit
625 heating unit
627 cooling unit
629 ultraviolet light station
631 optional heating unit
633 wind-up machine
635 roll of compensator
700 liquid crystal display

What is claimed is:

1. A method for manufacturing an optical compensator on a surface of a transitional substrate comprising:
    applying a retardation layer directly on the surface of the transitional substrate;
    applying a first orientation layer on the retardation layer;
    aligning said first orientation layer;
    applying a first anisotropic liquid crystal material on said first orientation layer; and
    wherein said transitional substrate is polyethylene terephthalate (PET).

2. A method for manufacturing an optical compensator on a transitional substrate as in claim 1 wherein said transitional substrate is removed.

3. A method for manufacturing an optical compensator on a transitional substrate as in claim 2 wherein said transitional substrate is removed with a load average stress less than 75 N/m.

4. A method for manufacturing an optical compensator on a transitional substrate as in claim 2 wherein said transitional substrate is removed with a load average stress less than 10 N/m.

5. A method of manufacturing an optical compensator on a transitional substrate as in claim 2 wherein said optical compensator is applied to a liquid crystal display cell (LCD).

6. A method for manufacturing an optical compensator on a transitional substrate as in claim 1 further comprising repeating the steps of applying the first orientation layer, aligning the first orientation layer and applying the first anisotropic layer to form a plurality of orientation layers and a plurality of anisotropic layers to form an integral component wherein an optical axis of each anisotropic layer is positioned relative to respective optical axis of said other anisotropic layers by an angle about an axis perpendicular to a plane of each of said substrates.

7. A method for manufacturing an optical compensator on a transitional substrate as in claim 6 further comprising a retardation layer on top of said pluralities of orientation layers and a plurality of anisotropic layers.

8. A method for manufacturing an optical compensator on a transitional substrate as in claim 1 further comprising repeating the steps of applying the first orientation layer, aligning the first orientation layer and applying the first anisotropic layer to form a second orientation layer and a second anisotropic layer to form an integral component, wherein an optical axis of said first anisotropic layer is positioned orthogonally relative to an optical axis of said second anisotropic layer about an axis perpendicular to a plane of each of said substrates.

9. A method for manufacturing an optical compensator on a transitional substrate as in claim 8 comprising a retardation layer on top of said second anisotropic layer.

10. A method for manufacturing an optical compensator on a transitional substrate as in claim 1 further comprising a retardation layer on top of said anisotropic layer.

11. A method for manufacturing an optical compensator on a transitional substrate as in claim 1 wherein said retardation layer is applied by coating.

12. A method for manufacturing an optical compensator on a transitional substrate as in claim 1 wherein said compensator thickness is less than 100 micrometers.

13. A method for manufacturing an optical compensator on a transitional substrate as in claim 1 wherein said compensator thickness is less than 30 micrometers.

14. A method for manufacturing an optical compensator on a transitional substrate as in claim 1 wherein said retardation layer has a birefringence less than 10 nm.

15. A method for manufacturing an optical compensator on a transitional substrate as in claim 1 wherein said retardation layer has a birefringence between 15–150 nm.

16. A method for manufacturing an optical compensator on a transitional substrate as in claim 1 wherein said retardation layer is comprised of triacetyl celluose (TAC).

17. A method for manufacturing an optical compensator on a transitional substrate as in claim 1 wherein said first orientation layer is applied by coating.

18. A method for manufacturing an optical compensator on a transitional substrate as in claim 1 wherein said first anisotropic liquid crystal material is applied by coating.

19. A method for manufacturing an optical compensator on a transitional substrate as in claim 1 wherein a barrier layer is applied between said retardation layer and said first orientation layer.

20. A method for manufacturing an optical compensator on a transitional substrate as in claim 1 wherein said orientation layer comprises a polyvinyl cinnamate.

21. A method for manufacturing an optical compensator on a transitional substrate as in claim 1 wherein said orientation layer is oriented through photoalignment using polarized light.

22. A method for manufacturing an optical compensator on a transitional substrate as in claim 1 wherein said orientation layer is oriented through rubbing.

23. A method for manufacturing an optical compensator on a transitional substrate as in claim 1 wherein said anisotropic layer comprises a nematic calamitic liquid crystal.

24. A method for manufacturing an optical compensator on a transitional substrate as in claim 1 wherein said anisotropic layer comprises a nematic discotic liquid crystal.

25. A method for manufacturing an optical compensator on a transitional substrate as in claim 1 wherein said anisotropic liquid crystal material is polymerizable via actinic radiation.

26. A method for manufacturing an optical compensator on a surface of a transitional substrate comprising:
   applying a retardation layer directly on the surface of the transitional substrate;
   applying a first orientation layer on the retardation layer;
   aligning said first orientation layer;
   applying a first anisotropic liquid crystal material on said first orientation layer; and
   wherein said transitional substrate is extruded.

27. A method for manufacturing an optical compensator on a surface of a transitional substrate comprising:
   applying a retardation layer directly on the surface of the transitional substrate;
   applying a first orientation layer on the retardation layer;
   aligning said first orientation layer;
   applying a first anisotropic liquid crystal material on said first orientation layer; and
   wherein said transitional substrate is cast from a solution of polymer and solvent.

28. A method for manufacturing an optical compensator on a surface of a transitional substrate comprising:
   applying a retardation layer directly on the surface of the transitional substrate;
   applying a first orientation layer on the retardation layer;
   aligning said first orientation layer;
   applying a first anisotropic liquid crystal material on said first orientation layer;
   repeating the steps of applying the first orientation layer, aligning the first orientation layer and applying the first anisotropic layer to form a second optical compensator;
   bonding together said first and second optical compensators so that an optical axis of said first anisotropic layer in one optical compensator is positioned orthogonally relative to an optical axis of a second anisotropic layer in said second optical compensator about an axis perpendicular to a plane of each of said substrates; and
   removing each of said transitional substrates from a compound compensation film.

* * * * *